(12) United States Patent
Lee et al.

(10) Patent No.: US 6,882,660 B2
(45) Date of Patent: Apr. 19, 2005

(54) METHOD FOR REPEATING DATA TRANSMISSION IN MOBILE COMMUNICATION SYSTEM

(75) Inventors: Chong-Won Lee, Seoul (KR); Yu-Ro Lee, Seoul (KR); Jeong-Hwa Ye, Seoul (KR); Ho-Geun Lee, Seoul (KR)

(73) Assignee: UTStarcom Korea Limited (C/O of UTStarcom, Inc.), Alameda, CA (US)

( * ) Notice: Subject to any disclaimer, the term of this patent is extended or adjusted under 35 U.S.C. 154(b) by 527 days.

(21) Appl. No.: 09/865,003

(22) Filed: May 24, 2001

(65) Prior Publication Data

US 2002/0028688 A1 Mar. 7, 2002

(30) Foreign Application Priority Data

Sep. 5, 2000 (KR) .......................................... 2000-52487

(51) Int. Cl.⁷ .................................................. H04J 3/22
(52) U.S. Cl. ........................ 370/469; 370/235; 370/252; 370/355; 370/356; 370/465; 370/473; 455/69; 455/503
(58) Field of Search ................................ 455/63.1, 503, 455/69; 370/252, 349, 338, 235, 355, 356, 465, 469, 473

(56) References Cited

U.S. PATENT DOCUMENTS

| | | | |
|---|---|---|---|
| 5,870,406 A | 2/1999 | Ramesh et al. ................. 371/6 |
| 5,896,402 A | 4/1999 | Kurobe et al. ................ 371/32 |
| 6,021,124 A | 2/2000 | Haartsen ...................... 370/336 |
| 6,128,763 A | 10/2000 | LoGalbo et al. ............. 714/774 |
| 6,167,273 A | * 12/2000 | Mandyam .................... 455/450 |
| 6,289,054 B1 | * 9/2001 | Rhee ...................... 375/240.27 |
| 6,289,217 B1 | * 9/2001 | Hamalainen et al. ....... 455/425 |
| 6,654,384 B1 | * 11/2003 | Reza et al. .................. 370/469 |
| 2002/0145991 A1 | * 10/2002 | Miya et al. ................. 370/337 |
| 2003/0053440 A1 | * 3/2003 | Gruhn et al. ............... 370/349 |

\* cited by examiner

*Primary Examiner*—Nay Maung
*Assistant Examiner*—Raymond Dean
(74) *Attorney, Agent, or Firm*—McDonnell Boehnen Hulbert & Berghoff LLP (57) ABSTRACT

A method for repeating data transmission between a reception side and a transmission side in a radio communication system wherein the transmission side includes a first upper layer and a first layer 1 and the reception side includes a second upper layer and a second layer 1 includes the steps of: by the transmission side, measuring a radio environment; determining to perform repeated transmission or normal transmission based on a measurement result; and if it is determined to perform the repeated transmission, by the first upper layer of the transmission side, performing a first data processing; by the reception side, receiving data from the transmission side and determining if the repeated transmission or the normal transmission was performed; and if the repeated transmission was performed, by the second layer 1 of the reception side, performing a second data processing.

19 Claims, 7 Drawing Sheets

METHOD FOR REPEATING DATA TRANSMISSION IN MOBILE COMMUNICATION SYSTEM

FIELD OF THE INVENTION

This invention relates to a data transmission in a mobile communication system; and more particularly, to a method for transmitting data repeatedly between a transmission side and a reception side in a mobile communication system.

DESCRIPTION OF THE PRIOR ART

In case a radio environment for transmission is changed in a conventional radio communication system, a technology of increasing or decreasing power of transmitted data is applied. Also, in case a reception side request retransmission of the data because the reception side doesn't receive the transmitted data, an automatic repeat request (ARQ) technology is applied.

Considering a conventional power control method that is applied when the radio environment for transmission is changed, there are caused several problems. For example, a range for increasing or decreasing power at the transmission side is restricted. Also, under a radio environment beyond the restricted range, it is not guaranteed whether or not the data transmitted from the transmission side are properly received by the reception side.

Generally, in case erroneous data are received at the reception side, there is provided the automatic repeat request (ARQ) procedure by which the erroneous data can be recovered. The ARQ procedure includes an ARQ type I, an ARQ type II and an ARQ type III.

According to the ARQ type I, in case the reception side receives data that have an error-included fragment data, the reception side requests a transmission side to retransmit the fragment data without storing the error-included fragment data in a storage unit of the reception side. In response to the request, the transmission side retransmits the requested fragment data to the reception side at the same data coding rate as previous one.

According to the ARQ type II, in case the reception side receives data that have the error-included fragment data, the reception side stores the error-included fragment data in the storage unit and then requests the transmission side to retransmit the fragment data. In response to the request, the transmission side generates the requested fragment data at a modified data coding rate and then retransmits the generated fragment data to the reception side.

For example, if a data coding rate for the initial data transmission is "1/2", the retransmission is performed at a lower data coding rate of "1/3", "1/4" or the like. Here, the retransmitted data are not possible to restore itself, but to restore by being combined with data received at the reception side before the retransmission.

The ARQ type III is similar to the ARQ type II. A difference between two types is that the retransmitted data from the transmission side are possible not only to restore itself, but also to restore by being combined with data received at the reception side before the retransmission.

In the ARQ type I case, since the error-included fragment data are not stored in the storage unit of the reception side and the fragment data are retransmitted at the unchanged data decoding rate from the transmission side, the problem is that there is a high possibility that the retransmitted data will have errors again.

In case of the ARQ type II and III, an error correction capability is greater than that of the ARQ type I. However, there are caused a problem that signaling is increased which is required to operate the ARQ type II/III. Also, a storage-limited memory should be managed in which the erroneous data are stored.

SUMMARY OF THE INVENTION

It is an object of the present invention to provide a method for repeating data transmission between a reception side and a transmission side in a radio communication system wherein the transmission side includes a first upper layer and a first layer 1 and the reception side includes a second upper layer and a second layer 1 in order to guarantee a quality of data transmission under a bad status of a radio environment.

It is another object of the present invention to provide a method for performing data transmission between a reception side and a transmission side upon receiving erroneous data at the reception side in a radio communication system wherein the transmission side includes a first upper layer and a first layer 1 and the reception side includes a second upper layer and a second layer 1 to reduce space for storing received data required to correct erroneous data.

In accordance with an aspect of the present invention, there is provided a method for repeating data transmission between a reception side and a transmission side in a radio communication system wherein the transmission side includes a first upper layer and a first layer 1 and the reception side includes a second upper layer and a second layer 1, the method including the steps of: a) by the transmission side, measuring a radio environment; b) determining to perform repeated transmission or normal transmission based on a measurement result; c) if it is determined to perform the repeated transmission, by the first upper layer of the transmission side, performing a first data processing; d) by the reception side, receiving data from the transmission side and determining if the repeated transmission or the normal transmission was performed; and e) if the repeated transmission was performed, by the second layer 1 of the reception side, performing a second data processing.

In accordance with another aspect of the present invention, there is provided a method for performing data transmission between a reception side and a transmission side upon receiving erroneous data at the reception side in a radio communication system wherein the transmission side includes a first upper layer and a first layer 1 and the reception side includes a second upper layer and a second layer 1, the method including the steps of: a) by the transmission side, determining if the reception side requests to retransmit data in which an error occurred; b) if the reception side requests to retransmit the data in which the error occurred, by the first upper layer, performing a first data processing; c) by the reception side, receiving the data from the transmission side and determining if repeated transmission or normal transmission was performed; d) if the repeated transmission was performed, by the second layer 1, restoring/combining the received data repeatedly predetermined times; e) by the second layer 1, determining if the received data have errors; f) if the received data have errors, by the second layer 1, informing the second upper layer that the received data have errors; and g) by the second upper layer, requesting the transmission side to retransmit the data.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

In accordance with the present invention, there are provided two techniques for transmitting transmitted data exactly in a radio communication system. The radio communication system includes a CDMA 2000 system, a UMTS terrestrial radio access network (UTRAN) or the like.

A first technique is that a transmission side transmits data repeatedly so as to reduce an error generation at an initial data transmission, given an ill-conditioned radio environment.

There are some values indicating a status of a radio environment that is measured during traffic in a radio communication. The values include a signal to noise ratio (SNR), a bit error rate (BER) or the like.

Generally, a reception side requests the transmission side to perform a power control based on the values. At this time, there can be two cases of request. One case is that the reception side requests data transmission at over a predetermined power. The other case is that though the transmission side transmits the data at a maximum power, the reception side requests the data transmission at more power on account of an ill-conditioned radio environment. For each of two cases, the transmission side transmits the data to the reception side at a designated power one or mores times according to the first technique.

A second technique is applied to a case where upon data reception, an error is occurred at the reception side and the reception side requests the transmission side of data retransmission. In this case, the transmission side transmits the requested data to the reception side not using a new data coding procedure but one or more times repeatedly using an existing data coding procedure.

FIGS. 1A to 1D are pictorial representations illustrating structures of each radio communication network to which the present invention is applied.

As shown drawings, there can be provided 4 types of radio communication network depending on how a radio network and a core network are coupled to each other.

Figure 1A:
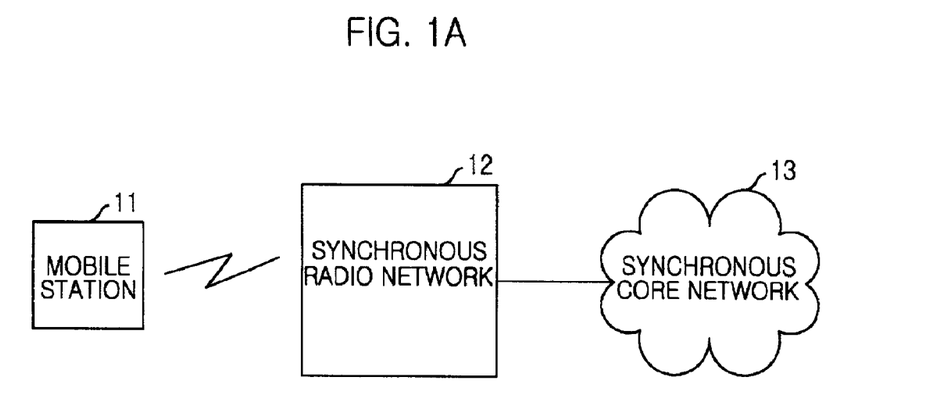
FIG. 1A shows a radio communication network including a mobile station (MS), a synchronous radio network and a synchronous core network.

FIG. 1A shows a radio communication network including a mobile station (MS) 11, a synchronous radio network 12 and a synchronous core network 13, e.g. an ANSI-41 core network.

Figure 1B:
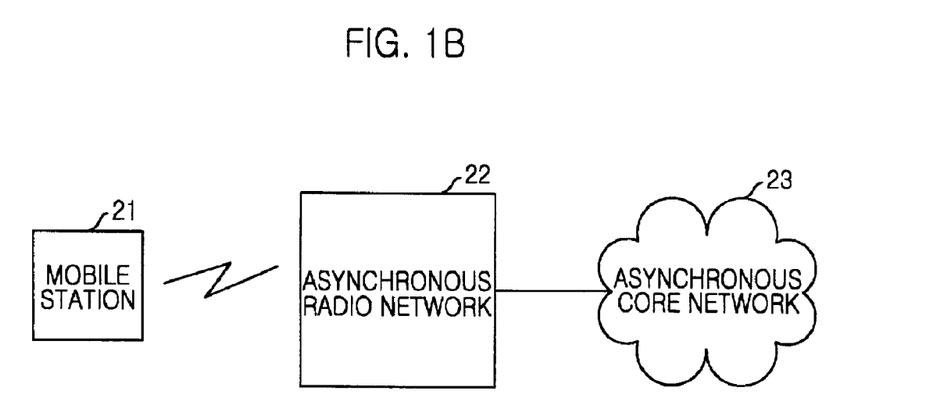
FIG. 1B shows a radio communication network including a mobile station (MS), an asynchronous radio network and an asynchronous core network.

FIG. 1B shows a radio communication network including a mobile station (MS) 21, an asynchronous radio network 22 and an asynchronous core network 23, e.g. a GSM-MAP core network.

Figure 1C:
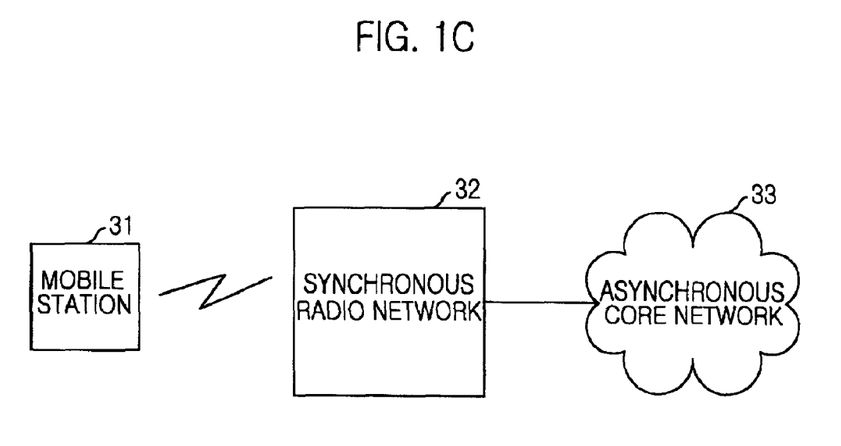
FIG. 1C shows a radio communication network including a mobile station (MS), a synchronous radio network and an asynchronous core network.

FIG. 1C shows a radio communication network including a mobile station (MS) 31, a synchronous radio network 32 and an asynchronous core network 33, e.g. a GSM-MAP core network.

Figure 1D:
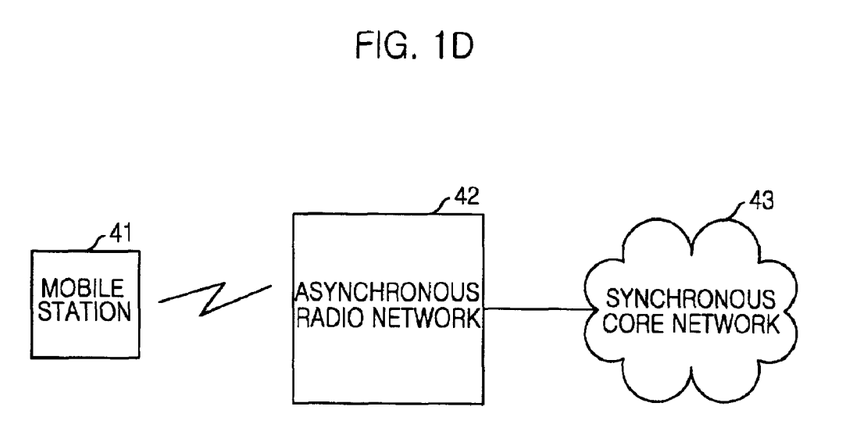
FIG. 1D shows a radio communication network including a mobile station (MS), an asynchronous radio network and a synchronous core network.

FIG. 1D shows a radio communication network including a mobile station (MS) 41, an asynchronous radio network 42 and a synchronous core network 43, e.g. an ANSI-41 core network.

The present invention is applied to data transmission between a mobile station (MS) and a radio network shown in the drawings. In this case, it is not necessary to take into consideration types of a radio network and a core network which are coupled to each other. That is to say, the present invention is applied the data transmission between the MS and the radio network disregarding whether the radio network is synchronous or asynchronous and the core network is synchronous or asynchronous.

Figure 2:
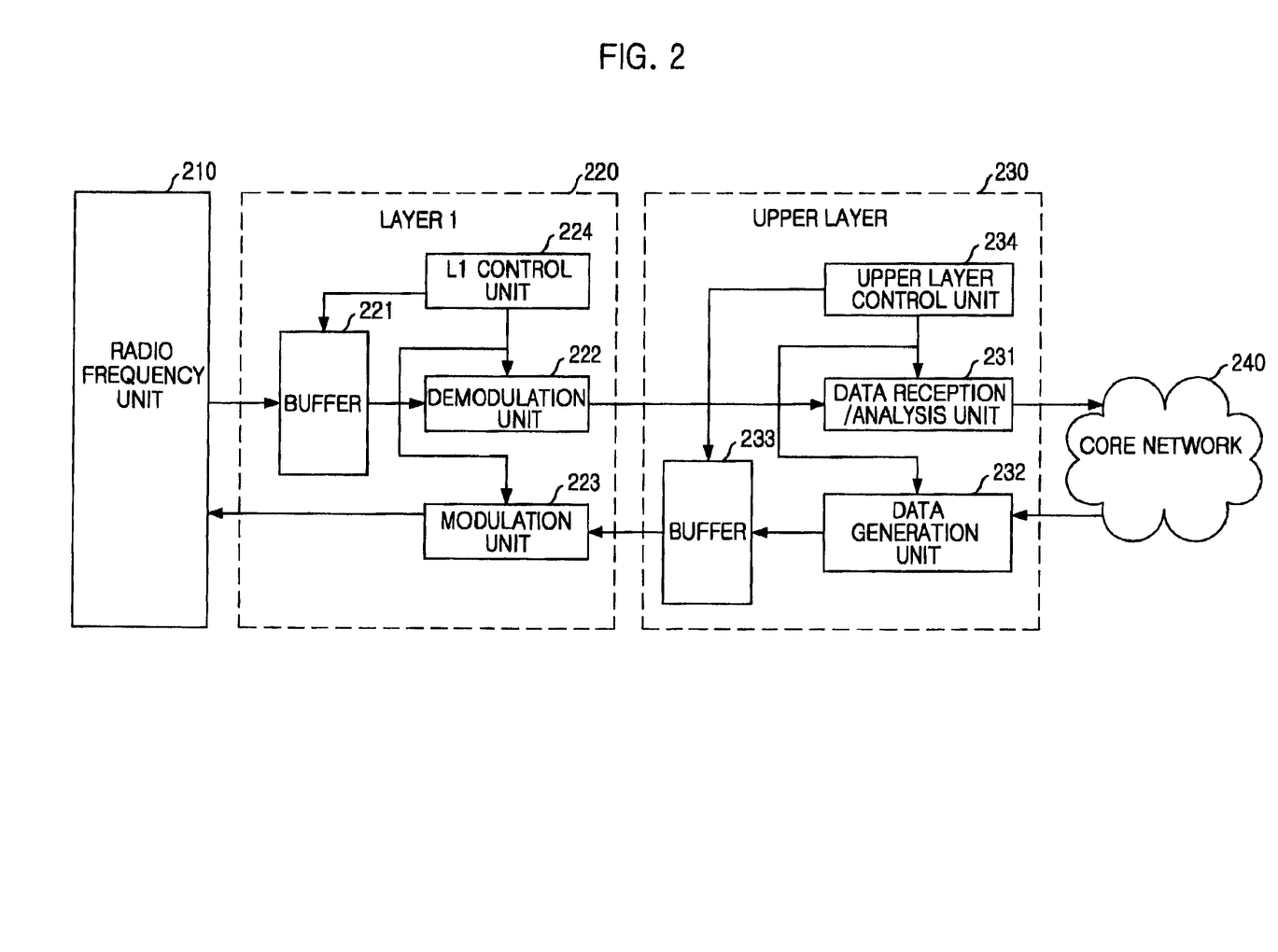
FIG. 2 shows a configuration of an apparatus for transmitting data repeatedly in a radio communication system to which the present invention is applied.

FIG. 2 shows a configuration of an apparatus for transmitting data repeatedly in a radio communication system to which the present invention is applied.

As shown in FIG. 2, when a radio frequency (RF) unit 210 receives radio data, the RF unit 210 transmits the radio data to a buffer 221 of a layer 1 220. When receiving modulated data from a modulation unit 223 of the layer 1 220, the RF unit 210 converts a modulated data format to a radio data format and then transmits the converted data to outside of the RF unit 210.

Radio data that are transmitted via the RF unit 210 from the outside are stored in the buffer 221 of the layer 1 220 and according to a direction of L 1 control unit 224, the buffer 221 supplies the radio data to a demodulation unit 222 of the layer 1 220.

Under control of the L 1 control unit 224, the demodulation unit 222 demodulates the radio data supplied from the buffer 221 and then transmits the demodulated data to a data reception/analysis unit 231 of an upper layer 230.

The modulation unit 223 modulates data from a buffer 233 of the upper layer 230 according to instructions of the L 1 control unit 224 and then transmits the modulated data to the outside via the RF unit 210.

As seen from described above, the L 1 control unit 224 controls the buffer 221, the demodulation unit 222 and the modulation unit 223 that are included in the layer 1 220.

Referring to the Upper layer 230, the data reception/analysis unit 231 of the upper layer 230 receives and analyzes the demodulated data from the demodulation unit 222 according to a direction of an upper layer control unit 234 and then transmits the data to a core network 240.

A data generation unit 232 of the upper layer 230 supplies data from the core network 240 to the buffer 233 of the upper layer 230 under control of the upper layer control unit 234 and the buffer 233 supplies the data stored therein to the modulation unit 223 of the layer 1 220 according to a direction of the upper layer control unit 234.

The upper layer control unit 234 controls the data reception/analysis unit 231, the data generation unit 232 and the buffer 233 that are included in the upper layer 230.

Figure 3A:
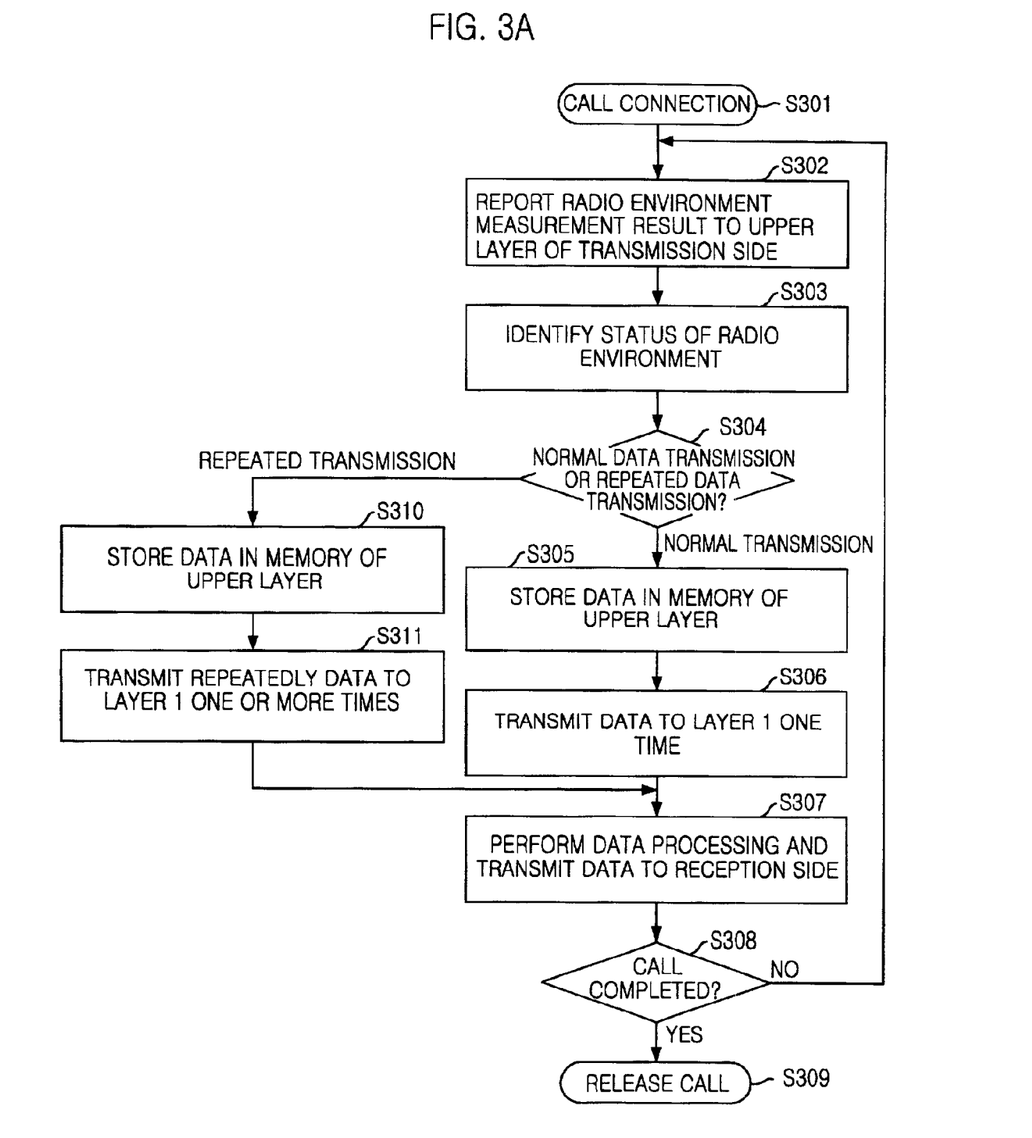
FIG. 3A is a flow chart illustrating a method for transmitting data repeatedly depending on a radio environment in a radio communication system in accordance with the present invention.

FIG. 3A is a flow chart illustrating a method for transmitting data repeatedly depending on a radio environment in a radio communication system in accordance with the present invention.

A call is connected at the step S301.

At the step S302, a layer 1 of a transmission side reports a measurement result to an upper layer of the transmission side by measuring a radio environment periodically or on a predetermined time.

At the step S303, the upper layer identifies a status of the radio environment based on the measurement result reported from the layer 1.

At the step S304, the upper layer determines whether it will perform normal data transmission or repeated data transmission. The normal data transmission means that data are to be transmitted one time. The repeated data transmission means that the data are to be transmitted one or more times. The repeated data transmission is performed in case the radio environment is bad conditioned at less than a predetermined threshold value.

If the upper layer determines to perform the normal data transmission, at the step S305, the upper layer stores the data in a memory thereof.

At the step S306, the upper layer transmits the data to the layer 1 one time.

After receiving the data from the upper layer, at the step S307, the layer 1 performs data processing such as modulation and transmits the data to a reception side.

At the step S308, it is determined if the call is completed, and if not, the logic flow returns to the step S302, otherwise proceeds to the step S309 where the call is released.

If the upper layer determines to perform the repeated data transmission as the determination result of the step S304, at the step S310, the upper layer stores the data in the memory thereof.

At the step S311, the upper layer transmits repeatedly the data to the layer 1 one or more times, e.g., N times (N=integer) and then the logic flow proceeds to the step S307.

The repeated N times can be determined based on conditions that include a radio environment such as a bit error rate (BER) and a signal to noise ratio (SNR) at a transmission time, a load status of a transmission side system, quality of service (QOS) of transmitted data or the like. Besides, the N can be assigned as a fixed value by taking the conditions into consideration before beginning to provide the service.

In the repeated transmission, there are two ways of transmitting transmission information to the reception side. The transmission information includes information about the repeated transmission or the normal transmission. A first way is that before transmitting the data to the reception side, the transmission information is provided to the reception side that is included in an upper layer message. A second way is that at the time of transmitting the data to the reception side, the transmission information is provided to a block which the layer 1 of the reception side can identify.

In case of the first way of transmitting the transmission information, the upper layer transmits the data and the transmission information to the layer 1. After receiving the data and the transmission information, the layer 1 performs data processing that includes modulation or the like and then transmits the data to the reception side. In this case, the upper layer message including the transmission information should be transmitted from the transmission side to the reception side before the layer 1 transmits the data to the reception side.

In case of the second way of transmitting the transmission information, the upper layer transmits the data and the transmission information to the layer 1. After receiving the data and the transmission information, the layer 1 performs data processing that includes modulation or the like and then transmits the data and the transmission information to the reception side. In this case, different from the first way, the transmission information is transmitted to the reception side over a path that can be recognized by the layer 1 of the reception side, the path including a dedicated physical control channel (DPCCH).

A way that the upper layer of the transmission side stores the data the buffer therein and manages the stored data is as follows. In a data-storage procedure, the upper layer stores all data to be transmitted the buffer therein. In a data-clear procedure, if the reception side requests to retransmit the data, the upper layer clears data transmitted earlier than the data from the buffer because the earlier data are correctly transmitted to the reception side. In another data-clear procedure, the upper layer clears some data from the buffer if the reception side doesn't request to retransmit the data during a predetermined time.

Figure 3B:
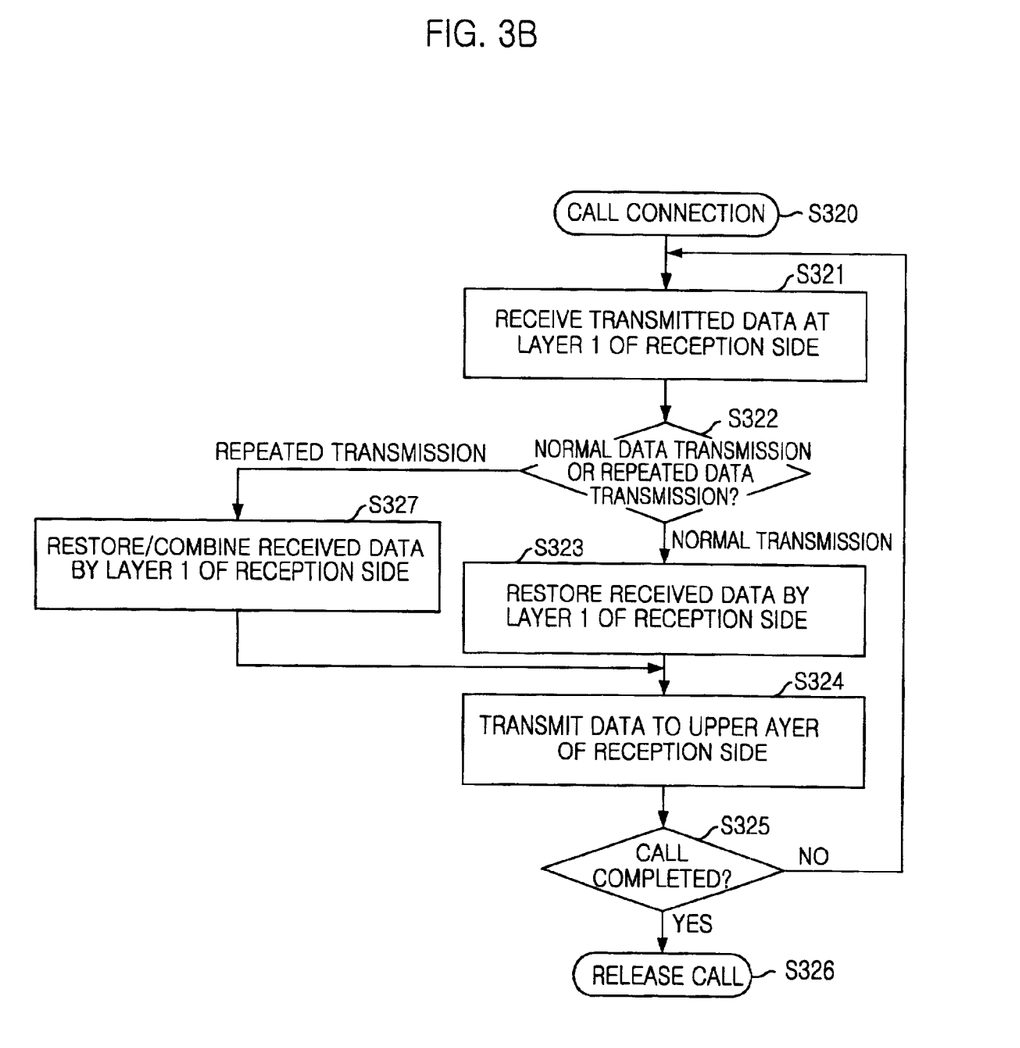
FIG. 3B is a flow chart illustrating a method for receiving data repeatedly depending on a radio environment in a radio communication system in accordance with the present invention.

FIG. 3B is a flow chart illustrating a method for receiving data repeatedly depending on a radio environment in a radio communication system in accordance with the present invention.

A call is connected at the step S320.

At the step S321, A layer 1 of a reception side receives data transmitted from the transmission side.

At the step S322, the layer 1 of the reception side determines whether normal data transmission or repeated data transmission was performed to transmit the data. The determination procedure is performed based on transmission information. Here, before receiving the data, the reception side can receive the transmission information that is included in an upper layer message. On the other hand, the reception side can receive the transmission information along with the data, wherein the transmission information is transmitted over a path that can be recognized by the layer 1 of the reception side.

If the normal transmission was performed, at the step S323, the layer 1 of the reception side restores the received data by performing modulation or the like.

At the step S324, the layer 1 of the reception side transmits the data to the upper layer of the reception side.

At the step S325, it is determined if the call is completed, and if not, the logic flow returns to the step S321, otherwise the logic flow proceeds to the step S326 where the call is released.

If the repeated transmission was performed, at the step S327, the layer 1 of the reception side restores/combines the received data repeatedly predetermined times. In order to perform a data-combination, a maximal ratio combining (MRC) process is used which is used at a rake receiver.

Figure 4A:
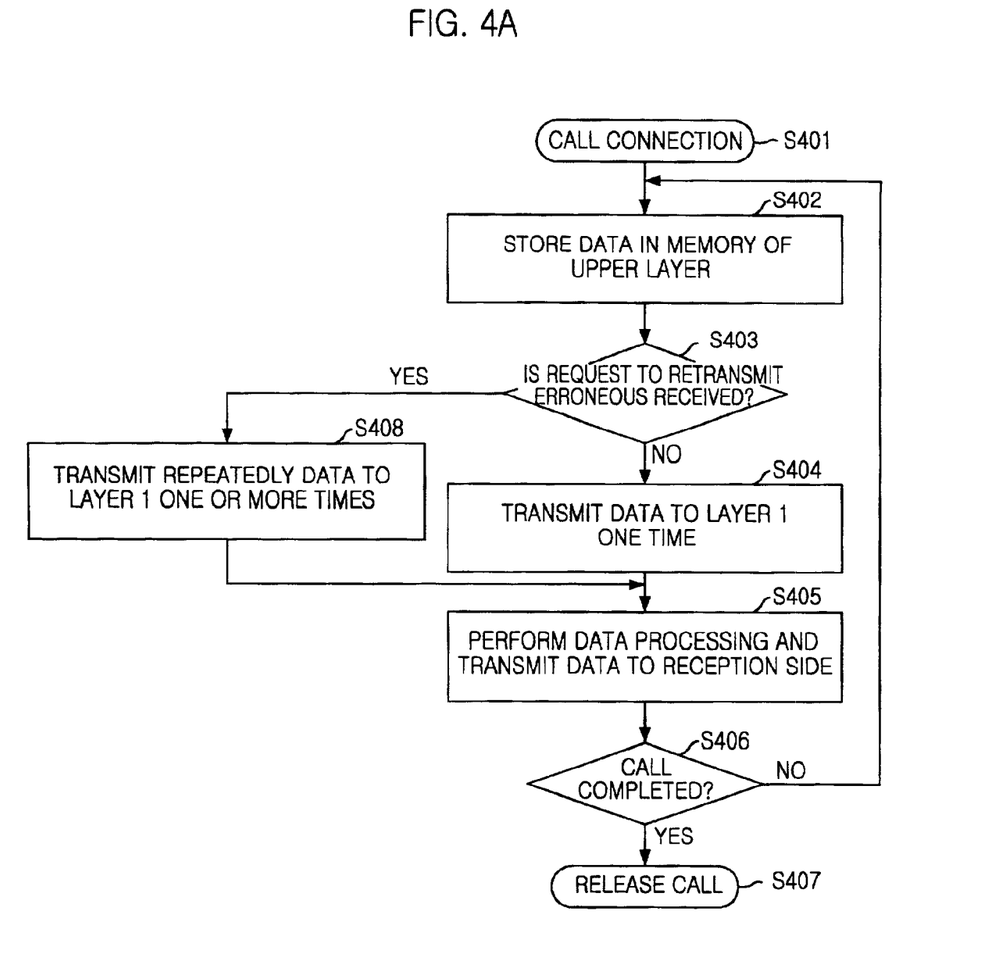
FIG. 4A is a flow chart illustrating a method for transmitting data repeatedly when an error occurred in the data that a reception side receives in a radio communication system in accordance with the present invention.

FIG. 4A is a flow chart illustrating a method for transmitting data repeatedly when an error occurred in the data that a reception side receives in a radio communication system in accordance with the present invention.

A call is connected at the step S401.

At the step S402, an upper layer of the transmission side stores data to be transmitted in a memory therein.

At the step S403, the upper layer of the transmission side determines if the reception side requests to retransmit data that include an error, and if not, the logic flow proceeds to the step S404 where the upper layer of the transmission side transmits to the layer 1 of the transmission side the data to be transmitted currently that are stored in the memory.

At the step S405, the layer 1 performs data processing such as modulation and transmits the data to a reception side.

At the step S406, it is determined if the call is completed, and if not, the logic flow returns to the step S402, otherwise proceeds to the step S407 where the call is released.

If the reception side requests to retransmit the data that include the error, at the step S408, the upper layer transmits repeatedly the data to the layer 1 of the transmission side one or more times, e.g., N times (N=integer) and then the logic flow proceeds to the step S405.

The repeated N times can be determined based on conditions that include a radio environment such as a bit error rate (BER) and a signal to noise ratio (SNR) at a transmission time, a load status of a transmission side system, quality of service (QOS) of transmitted data or the like. Besides, the N can be assigned as a fixed value by taking the conditions into consideration before beginning to provide the service.

In the repeated transmission, there are two ways of transmitting transmission information to the reception side. The transmission information includes information about the repeated transmission or the normal transmission. A first way is that before transmitting the data to the reception side, the transmission information is provided to the reception side that is included in an upper layer message. A second way is that at the time of transmitting the data to the reception side, the transmission information is provided to a block which the layer 1 of the reception side can identify.

Figure 4B:
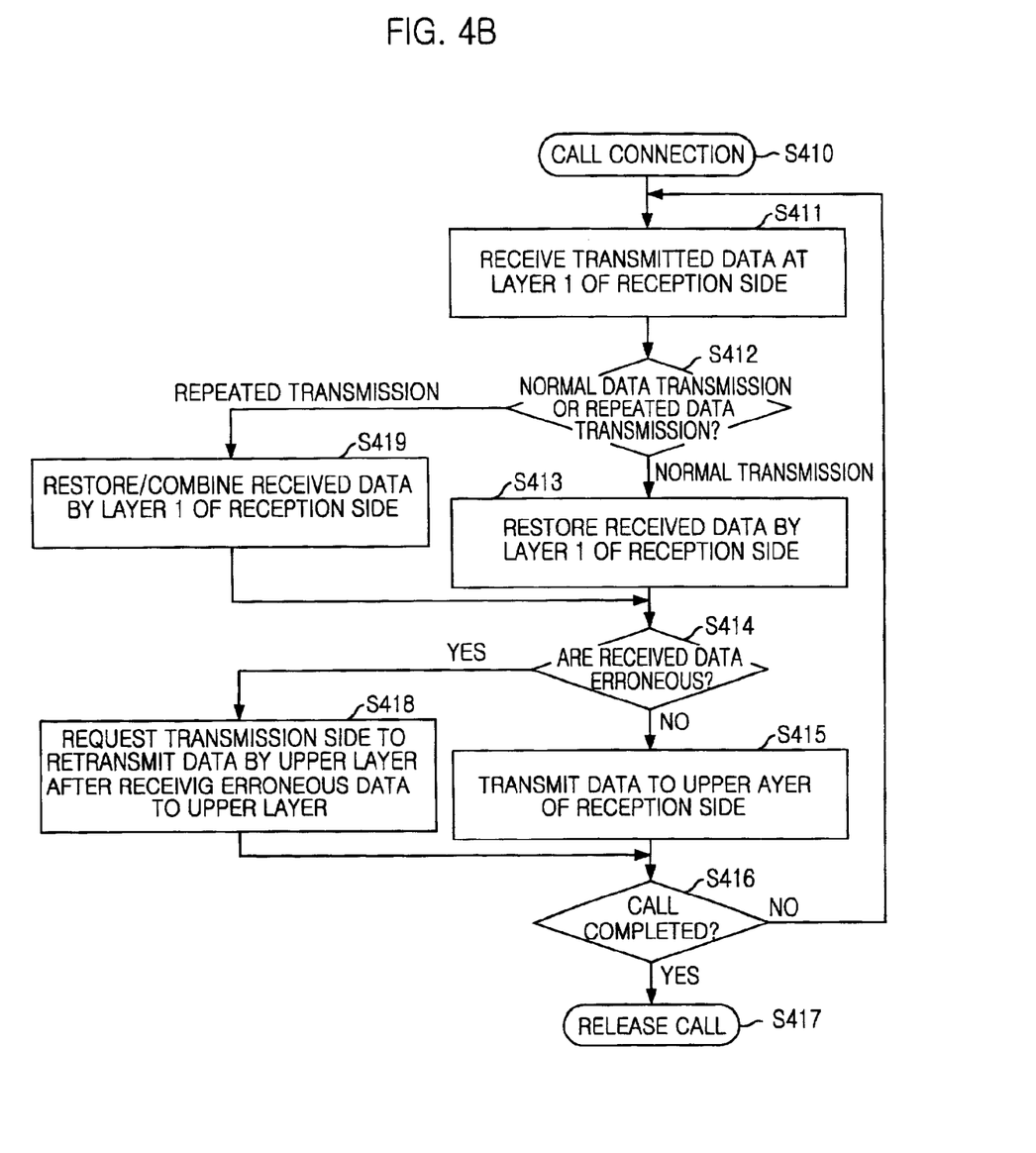
FIG. 4B is a flow chart illustrating a method for receiving data repeatedly when an error occurred in the data that a reception side receives in a radio communication system in accordance with the present invention.

FIG. 4B is a flow chart illustrating a method for receiving data repeatedly when an error occurred in the data that a reception side receives in a radio communication system in accordance with the present invention.

A call is connected at the step S410.

At the step S411, A layer 1 of a reception side receives data transmitted from the transmission side.

At the step S412, the layer 1 of the reception side determines whether normal data transmission or repeated data transmission was performed to transmit the data. The determination procedure is performed based on transmission information. Here, before receiving the data, the reception side can receive the transmission information that is included in an upper layer message. On the other hand, the reception side can receive the transmission information along with the data, wherein the transmission information is transmitted over a path that can be recognized by the layer 1 of the reception side.

If the normal transmission was performed, at the step S413, the layer 1 of the reception side restores the received data by performing modulation or the like.

At the step S414, the layer 1 of the reception side determines if the received data have an error, and if not, the logic flow proceeds to the step S415 where the layer 1 of the reception side transmits the data to an upper layer of the reception side.

At the step S416, it is determined if the call is completed, and if not, the logic flow returns to the step S411, otherwise, the logic flow proceeds to the step S417 where the call is released.

If the received data have the error, at the step S418, the layer 1 of the reception side transmits the erroneous data to the upper layer of the reception side and after reception, the upper layer requests the transmission side to retransmit the data by transmitting a retransmission request message.

If the repeated transmission was performed, at the step S419, the layer 1 of the reception side restores/combines the received data repeatedly predetermined times. In order to perform a data-combination, a maximal ratio combining (MRC) process is used which is used at a rake receiver.

In accordance with the present invention, there are a couple of advantages: that a quality of data transmission can be maintained by transmitting data repeatedly given a bad status of a radio environment; that error-occurrence can be decreased without increasing hardware complexity; and that since the reception side can restore data by using the data that are transmitted from the transmission side repeatedly in response to a retransmission request, erroneous data of the past need not to be stored to thereby reduce a size of a buffer for storing received data.

Although the preferred embodiments of the invention have been disclosed for illustrative purpose, those skilled in the art will appreciate that various modifications, additions, and substitutions are possible, without departing from the scope and spirit of the invention as disclosed in the accompanying claims.

What is claimed is:

1. A method for repeating data transmission between a reception side and a transmission side in a radio communication system wherein the transmission side includes a first upper layer and a first layer 1 and the reception side includes a second upper layer and a second layer 1, the method comprising the steps of:

a) by the transmission side, measuring a radio environment;

b) determining to perform repeated transmission or normal transmission based on a measurement result;

c) if it is determined to perform the repeated transmission, by the first upper layer of the transmission side, performing a first data processing;

d) by the reception side, receiving data from the transmission side and determining if the repeated transmission or the normal transmission was performed; and e) if the repeated transmission was performed, by the second layer 1 of the reception side, performing a second data processing, wherein the first data processing includes the steps of:
      by the first upper layer, storing the data in a first storage unit thereof and managing the stored data;
      by the first upper layer, transmitting transmission information and the stored data to the first layer 1, the transmission information including information about the repeated transmission;
      by the first layer 1, storing the received data in a second storage unit thereof; and
      by the first layer 1, transmitting the data to the reception side repeatedly predetermined times based on the transmission information,
      wherein the predetermined times are determined based on first conditions including bit error rate (BER), signal to noise ratio (SNR), a load status of a transmission side system and quality of service (QoS) of transmitted data, the first conditions measured at the time of data transmission.

2. The method as recited in claim 1, wherein measuring the radio environment is performed periodically by the first layer o1 of the transmission side.

3. The method as recited in claim 2, wherein the step b) includes the steps of:
- b1) if the measured radio environment is characterized by a lower value than a predetermined threshold value, performing the repeated transmission; and
- b2) if the measured radio environment is characterized by a higher value than the predetermined threshold value, performing the normal transmission.

4. The method as recited in claim 3, wherein determining to perform the repeated transmission or the normal transmission is performed at the first upper layer of the transmission side based on the measurement result that s reported from the first layer 1.

5. The method as recited in claim 1, wherein the predetermined times are determined based on second conditions including bit error rate (BER), signal to noise ratio (SNR), a load status of the transmission side system and quality of service (QoS) of transmitted data, the second conditions measured before beginning a radio service.

6. The method as recited in claim 1, wherein receiving the data from the transmission side is performed at the second layer 1 of the reception side.

7. The method as recited in claim 6, wherein determining if the repeated transmission is performed at the second layer 1 of the reception side.

8. The method as recited in claim 7, wherein the transmission information is transmitted over a path recognizable by the second layer 1, the path including a dedicated physical control channel (DPCCH).

9. The method as recited in claim 8, wherein the second data processing includes the steps of:
- by the second layer 1, combining the data repeatedly predetermined times; and
- transmitting the combined data to the second upper layer.

10. The method as recited in claim 9, wherein combining the data is performed using a maximal ratio combining (MRC) process.

11. The method as recited in claim 10, wherein data to be retransmission-requested are stored and managed at the first storage unit of the first upper.

12. A method for performing data transmission between a reception side and a transmission side upon receiving erroneous data at the reception side in a radio communication system wherein the transmission side includes a first upper layer and a first layer 1 and the reception side includes a second upper layer and a second layer 1, the method comprising the steps of:
- a) by the transmission side, determining if the reception side requests to retransmit data in which an error occurred;
- b) if the reception side requests to retransmit the data in which the error occurred, by the first upper layer, performing a first data processing;
- c) by the reception side, receiving the data from the transmission side and determining if repeated transmission or normal transmission was performed;
- d) if the repeated transmission was performed, by the second layer 1, restoring/combining the received data repeatedly predetermined times;
- e) by the second layer 1, determining if the received data have errors;
- f) if the received data have errors, by the second layer 1, informing the second upper layer that the received data have errors; and
- g) by the second upper layer, requesting the transmission side to retransmit the data, wherein the first data processing includes the step of:
- by the first upper layer, transmission to the first layer 1 transmission information and the data stored in a first storage unit of the first upper layer, the transmission information including information about the repeated transmission;
- by the first layer 1, storing the data in a second storage unit thereof; and
- by the first layer 1, transmitting the data to the reception side repeatedly predetermined times based on the transmission information, wherein the predetermined times are determined based on first conditions including bit error rate (BER), signal to noise ratio (SNR), a load status of a transmission side system and quality of service (QoS) of transmitted data, the first conditions measured at the time of data transmission.

13. The method as recited in claim 12, wherein the predetermined times are determined based on second conditions including bit error rate (BER), signal to noise ratio (SNR), a load status of the transmission side system and quality of service (QoS) of transmitted data, the second conditions measured before beginning a radio service.

14. The method as recited in claim 12, wherein determining if the repeated transmission or the normal transmission was performed is performed at the second layer 1 based on the transmission information that is transmitted from the transmission side to the reception side.

15. The method as recited in claim 14, wherein the transmission information is transmitted over a path recognizable by the second layer 1, the path including a dedicated physical control channel (DPCCH).

16. The method as recited in claim 15, wherein combining the data is performed using a maximal ratio combining (MRC) process.

17. The method as recited in claim 16, wherein data to be retransmission-requested are stored and managed at a third storage unit of the second layer 1.

18. Computer-readable record media storing instructions performing a method for repeating data transmission between a reception side and a transmission side in a radio communication system wherein the transmission side includes a first upper layer and a first layer 1 and the reception side includes a second upper layer and a second layer 1, the method comprising the steps of:
- a) by the transmission side, measuring a radio environment;
- b) determining to perform repeated transmission or normal transmission based on a measurement result; and
- c) if it is determined to perform the repeated transmission, by the first upper layer of the transmission side, performing a first data processing;
- d) by the reception side, receiving data from the transmission side and determining if the repeated transmission or the normal transmission was performed; and
- e) if the repeated transmission was performed, by the second layer 1 of the reception side, performing a second data processing;

wherein the first data processing includes the steps of:
- by the first upper layer, storing the data in a first storage unit thereof and managing the stored data;
- by the first upper layer, transmitting transmission information and the stored data to the first layer 1, the transmission information including information about the repeated transmission;

by the first layer 1, storing the received data in a second storage unit thereof; and by the first layer 1, transmitting the data to the reception side repeatedly predetermined times based on the transmission information, wherein the predetermined times are determined based on first conditions including bit error rate (BER), signal to noise ratio (SNR), a load status of a transmission side system and quality of service (QoS) of transmitted data, the first conditions measured at the time of data transmission.

19. Computer-readable record media storing instructions performing a method for performing data transmission between a reception side and a transmission side upon receiving erroneous data at the reception side in a radio communication system wherein the transmission side includes a first upper layer and a first layer 1 and the reception side includes a second upper layer and a second layer 1, the method comprising the steps of:

a) by the transmission side, determining if the reception side requests to retransmit data in which an error occurred;

b) if the reception side requests to retransmit the data in which the error occurred, by the first upper layer, performing a first data processing;

c) by the reception side, receiving the data from the transmission side and determining if repeated transmission or normal transmission was performed;

d) if the repeated transmission was performed, by the second layer 1, restoring/combining the received data repeatedly predetermined times;

e) by the second layer 1, determining if the received data have errors;

f) if the received data have errors, by the second layer 1, informing the second upper layer that the received data have errors; and g) by the second upper layer, requesting the transmission side to retransmit the data, wherein the first data processing includes the step of:

by the first upper layer, transmitting to the first layer 1 transmission information and the data stored in a first storage unit of the first upper layer, the transmission information including information about the repeated transmission;

by the first layer 1, storing the data in a second storage unit thereof; and by the first layer 1, transmitting the data to the reception side repeatedly predetermined times based on the transmission information, wherein the predetermined times are determined based on first conditions including bit error rate (BER), signal to noise ratio (SNR), a load status of a transmission side system and quality of service (QoS) of transmitted data, the first conditions measured at the time of data transmission.

* * * * *